No. 744,958. PATENTED NOV. 24, 1903.
H. COTTRELL.
TICKET PUNCH.
APPLICATION FILED APR. 8, 1903.
NO MODEL. 2 SHEETS—SHEET 1.

WITNESSES:
Howard C. Condit
Howard H. Ecker

INVENTOR
Herbert Cottrell

No. 744,958. PATENTED NOV. 24, 1903.
H. COTTRELL.
TICKET PUNCH.
APPLICATION FILED APR. 8, 1903.
NO MODEL. 2 SHEETS—SHEET 2.

WITNESSES:
Howard C. Condit
Howard H. Eckert

INVENTOR
Herbert Cottrell

THE NORRIS PETERS CO., PHOTO-LITHO., WASHINGTON, D. C.

No. 744,958. Patented November 24, 1903.

UNITED STATES PATENT OFFICE.

HERBERT COTTRELL, OF NEWARK, NEW JERSEY, ASSIGNOR TO L. A. SAYRE & CO., OF NEWARK, NEW JERSEY, A FIRM.

TICKET-PUNCH.

SPECIFICATION forming part of Letters Patent No. 744,958, dated November 24, 1903.

Application filed April 8, 1903. Serial No. 151,607. (No model.)

*To all whom it may concern:*

Be it known that I, HERBERT COTTRELL, of the city of Newark, county of Essex, State of New Jersey, have invented certain new and useful Improvements in Ticket-Punches, of which the following is a specification.

The object of my invention is to provide a ticket-punch with a removable retractile spring, die, and punch of a simple, cheap, and durable form.

The novelty of my invention consists principally in the form of a removable retractile spring; but it further consists in so forming such retractile spring that it will also embody both die and punch, or either.

Figure 1:
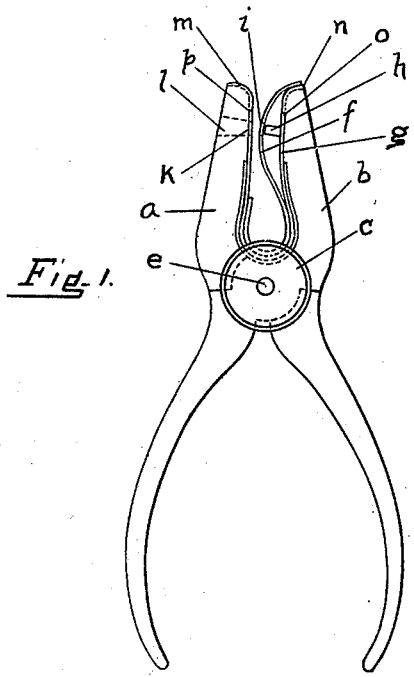
Figure 2:
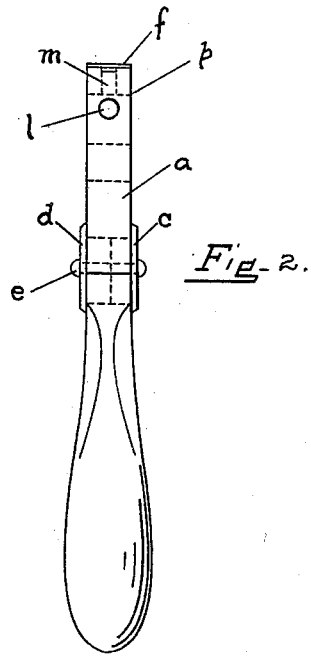
Figure 3:
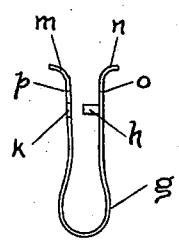
Figure 4:
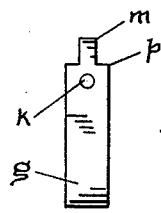
Figure 5:
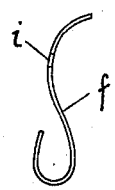
Figure 6:
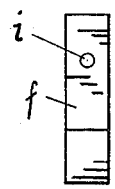
Figure 7:
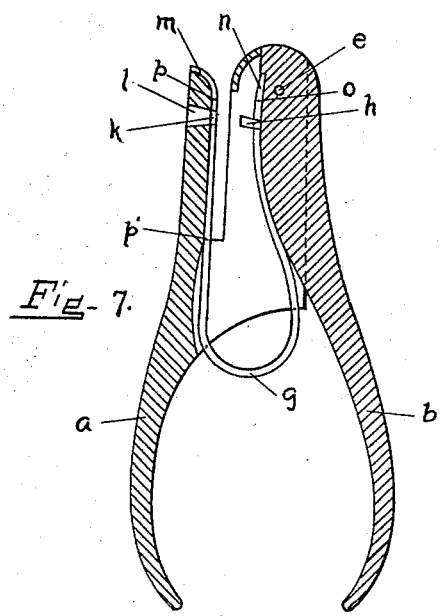
Figure 8:
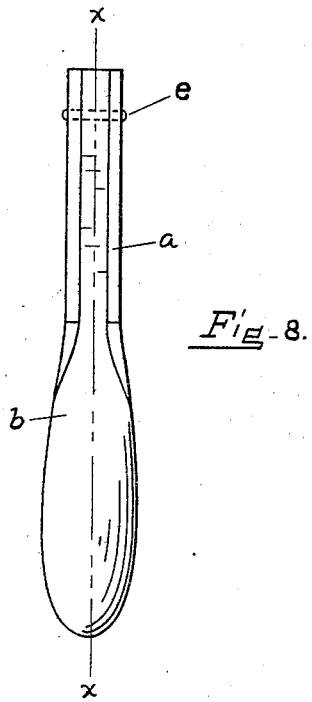
Figure 9:
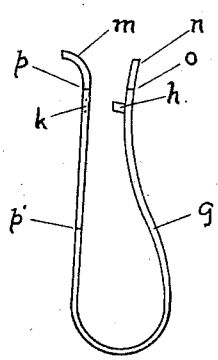
Figure 10:
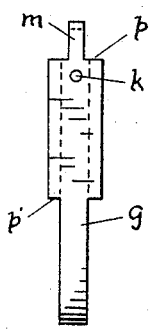
Figure 11:
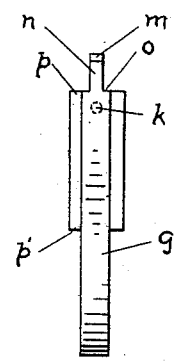

In the accompanying drawings, which form part of this specification, Figure 1 is a side view of my invention. Fig. 2 is an obverse view of same. Fig. 3 is a side view of removable spring, punch, and die. Fig. 4 is an obverse view of same. Fig. 5 is a side view of "stripper-spring." Fig. 6 is a top view of stripper-spring. Fig. 7 is a side view of my invention as applied to a form of ticket-punch. Fig. 8 is a top view of same. Fig. 9 shows removable retractile spring, punch, and die as applied in Fig. 7. Fig. 10 is an obverse view of same. Fig. 11 is a top view of same.

To carry out my invention, I cut a flat spring of proper form from sheet-steel, and preferably I perforate it near one end with the die-figure intended to be used. I then bend the spring with an easy curve, so that the ends thereof extend nearly parallel, but slightly flaring, and I harden and temper the same. I then provide it with a punch-post of soft steel attached opposite to the die-perforation. Handle members of a ticket-punch are prepared with suitable recesses adapted to receive and removably retain the said spring in a registering position. The act of closing the punch causes the hardened-die perforation to cut the soft-steel punch-post to its exact contour, and the retractile power of the said spring again opens the punch.

When the handle members are of suitable form, the punch may be used at once to perforate tickets; but when required by other forms a bent spring of sheet metal adapted to fit inside of the retractile spring may be employed to form a stripper.

Referring to the accompanying drawings, Figs. 1 to 11, inclusive, show the details of my invention, in all of which like letters of reference refer to similar parts.

$a$ and $b$ are the principal parts of a ticket-punch.

$c\ d$ are retaining-washers, and $e$ the pivot thereof.

$f$ is the stripper-spring, and $i$ the aperture therein.

$g$ is the retractile spring, which also carries the punch $h$ and the die-aperture $k$.

The opening to pass the cuttings through the punch is shown at $l$.

The retaining-tongues to hold the retractile spring in place are shown at $m\ n$, and the shoulders thereof are designated $o\ p$.

I wish it to be understood that I do not confine myself to the particular manner of holding the springs in place that I have shown and described, but may use any other means of removably holding them in operative position as coming within the scope of my invention.

What I claim, and desire to secure by Letters Patent of the United States, is—

1. In a ticket-punch, a retractile spring formed to embody a die-perforation and a punch-post, the said ticket-punch being adapted to receive and removably retain such spring, die, and punch-post, in a registering position as and for the purposes set forth.

2. In a ticket-punch, a removable retractile spring having an integrally-formed die-perforation, held in position to register with a punch-post upon the punch, and actuated by the closing of the ticket-punch, as and for the purposes set forth.

Signed this 6th day of April, 1903.

HERBERT COTTRELL.

Witnesses:
HOWARD C. CONDIT,
HOWARD H. ECKERT.